United States Patent
Nadeau et al.

(10) Patent No.: US 7,746,793 B2
(45) Date of Patent: Jun. 29, 2010

(54) CONSISTENCY BETWEEN MPLS FORWARDING AND CONTROL PLANES

(75) Inventors: Thomas D. Nadeau, Hampton, NH (US); Jean Philippe Vasseur, Dunstable, MA (US)

(73) Assignee: Cisco Technology, Inc., San Jose, CA (US)

( * ) Notice: Subject to any disclaimer, the term of this patent is extended or adjusted under 35 U.S.C. 154(b) by 1191 days.

(21) Appl. No.: 10/871,076

(22) Filed: Jun. 18, 2004

(65) Prior Publication Data

US 2005/0281192 A1 Dec. 22, 2005

(51) Int. Cl.
*G01R 31/08* (2006.01)
*H04L 12/28* (2006.01)

(52) U.S. Cl. ............... 370/244; 370/248; 370/395.5
(58) Field of Classification Search ............... 370/216, 370/217, 218, 219, 220
See application file for complete search history.

(56) References Cited

U.S. PATENT DOCUMENTS

| | | | |
|---|---|---|---|
| 7,336,615 B1 * | 2/2008 | Pan et al. | 370/248 |
| 2002/0060985 A1 * | 5/2002 | Lee et al. | 370/216 |
| 2003/0112749 A1 * | 6/2003 | Hassink et al. | 370/225 |
| 2003/0210705 A1 * | 11/2003 | Seddigh et al. | 370/419 |
| 2005/0013242 A1 * | 1/2005 | Chen et al. | 370/228 |
| 2005/0188100 A1 * | 8/2005 | Le Roux et al. | 709/238 |
| 2007/0011284 A1 * | 1/2007 | Le Roux et al. | 709/223 |

OTHER PUBLICATIONS

Awduche et al., "Requirements for Traffic Engineering Over MPLS," RFC 2702, Internet Engineering Task Force, Sep. 1999.
Berger et al., "Generalized MLPS Signaling—RSVP-TE Extensions," RFC 3473, Internet Engineering Task Force, Jan. 2003.
Braden et al., "Resource ReSerVation Protocol (RSVP)—Version 1 Functional Specification," RFC 2205, Internet Engineering Task Force, Sep. 1977.
Farrel et al., "Encoding of Attributes for Multiprotocol Label Switching (MPLS) Label Switched Path (LSP) Establishment Using RSVP-TE," IETF Internet Draft, Mar. 2004.
Kompella et al., "Detecting MPLS Data Plane Failures," IETF Internet Draft, Feb. 2004.

(Continued)

*Primary Examiner*—Seema S Rao
*Assistant Examiner*—Christine Duong
(74) *Attorney, Agent, or Firm*—Cindy Kaplan

(57) ABSTRACT

Systems and methods for assuring consistency between MPLS forwarding and control planes. The control plane can be made aware of forwarding plane anomalies and can respond appropriately. One particular application is assuring consistency between forwarding and control planes of a Fast Reroute backup tunnels used to protect an MPLS Traffic Engineering LSP from a link and/or a node failure. When a backup tunnel forwarding failure is detected, the control plane can react by, for example, rerouting the backup tunnel and/or sending a notification to the operator or head-end of the protected Traffic Engineering LSP.

18 Claims, 4 Drawing Sheets

OTHER PUBLICATIONS

Pan et al., "Fast Reroute Techniques in RSVP-TE," Internet Draft, Internet Engineering Task Force, Nov. 2004.
E. Rosen, "Multiprotocol Label Switching Architecture," RFC 3031, Internet Engineering Task Force, Jan. 2001.
Swallow et al., "Label Switching Router Self-Test", IETF Internet Draft, Oct. 2004.
Ken Owens et al., "A Path Protection/Restoration Mechanism for MPLS Networks", IEFT Draft, Jul. 2001.
Carlo Cavazzoni et al., "The IP/MPLS Over ASON/GMPLS Test Bed of the IST Project LION", Journal of Lightwave Technology, vol. No. 21, No. 11, Nov. 2003.
George Suwala et al., SONET/SDH - "Like Resilience for IP Networks: A Survey of Traffic Protection Mechanisms", IEEE Network, Mar./Apr. 2004.

* cited by examiner

CONSISTENCY BETWEEN MPLS FORWARDING AND CONTROL PLANES

BACKGROUND OF THE INVENTION

The present invention relates to data networking, and more particularly, in certain implementations, to systems and methods for improving synchronization between the forwarding and control planes.

MPLS (Multi-Protocol Label Switching) Traffic Engineering has been developed to meet data networking requirements such as guaranteed available bandwidth. MPLS Traffic Engineering exploits modem label switching techniques to build guaranteed bandwidth end-to-end tunnels through an IP/MPLS network of label switched routers (LSRs). These tunnels are a type of label switched path (LSP) and thus are generally referred to as MPLS Traffic Engineering LSPs.

Like with all IP systems, it is useful to divide MPLS Traffic Engineering network functionality into two entities, the "forwarding plane" (also referred to as the "data plane") and the "control plane." On each router the forwarding plane takes the received packet, looks at its destination address and/or label, consults a table, and sends the packet in a direction and manner specified by the table. This table is referred to as a forwarding table. The term "control plane" refers to the entities and processes by which the forwarding tables are populated with their contents.

For MPLS Traffic Engineering the control plane is concerned with, among other things, the placement and signaling of the Traffic Engineering tunnels. Traffic Engineering tunnels are signaled using extensions to the well-known RSVP protocol. After tunnels are signaled and the path established, the forwarding tables along that path from the ingress to the egress should support the operation of the new tunnel. When everything is working correctly, data having a forwarding equivalence class (FEC) assigned to a particular tunnel will arrive at the head-end and be forwarded from node to node along the tunnel path due to the previously established contents of the corresponding forwarding tables.

However, it is possible that the forwarding plane may fail at some point between the head-end and tail-end of the Traffic Engineering LSP without the control plane being affected. For example, the contents of one of the forwarding tables may be corrupted and no control plane entity may be aware of this corruption. The result of this situation is that data belonging to the tunnel is "black holed" without any attempt to reroute the LSP since the Traffic Engineering LSP is considered to be operational from a control plane perspective. The situation poses a problem in that reliability and quality of service guarantees will not be met.

To protect against node and link failures along MPLS Traffic Engineering LSPs, so-called Fast Reroute techniques have been developed. When a failure occurs, traffic is very quickly rerouted onto a preconfigured backup tunnel by the node immediately upstream from the failure. These backup tunnels can however suffer from the same mis-synchronization between the forwarding and control planes discussed with reference to the primary Traffic Engineering tunnels. This is especially problematic since it is the backup tunnels which are to provide protection in the event of failure and a breakdown in the forwarding plane may not be noticed in advance of a failure.

Prior to the failure, the immediately preceding node (also referred to as a point of local repair or PLR) may think that the backup tunnel is operational based on its understanding that the control plane is operational. This PLR would thus report to the protected Traffic Engineering head-end that the Traffic Engineering tunnel is in fact protected at that PLR. Thus when a link or node fails, traffic is rerouted onto a backup tunnel even though its forwarding plane is corrupted, rendering the desired local protection ineffective.

Systems and methods are needed for assuring consistency between the forwarding and control planes for LSPs such as, e.g., MPLS Traffic Engineering tunnels and MPLS Fast Reroute tunnels.

SUMMARY OF THE INVENTION

Embodiments of the present invention provide systems and methods for assuring consistency between MPLS forwarding and control planes. The control plane can be made aware of forwarding plane anomalies and can respond appropriately. One particular application is assuring consistency between forwarding and control planes of a Fast Reroute backup tunnels used to protect an MPLS Traffic Engineering LSP from a link and/or a node failure. When a backup tunnel forwarding failure is detected, the control plane can react by, for example, rerouting the backup tunnel and/or sending a notification to the operator or head-end of the protected Traffic Engineering LSP.

A first aspect of the present invention provides a method for assuring operation of a label switched path (LSP). The method includes: verifying forwarding state of routers along the LSP, and, if the verifying detects corrupted forwarding state along the LSP, notifying a control plane entity for the LSP, and using the control plane entity to reroute the label switched path.

A second aspect of the present invention provides a method for assuring availability of Fast Reroute protection for an MPLS Traffic Engineering LSP. The method includes: at a selected router along the MPLS traffic engineering LSP, verifying forwarding state of a Fast Reroute tunnel and, if the verifying detects corrupted forwarding state along the Fast Reroute tunnel, rerouting the Fast Reroute tunnel.

A third aspect of the present invention provides a method for assuring availability of Fast Reroute protection for an MPLS Traffic Engineering LSP. The method includes: at a selected router along the MPLS Traffic Engineering LSP, verifying forwarding state of a Fast Reroute tunnel, and, if the verifying detects corrupted forwarding state along the Fast Reroute tunnel, notifying a head-end router of the MPLS Traffic Engineering LSP corrupted forwarding state.

Further understanding of the nature and advantages of the inventions herein may be realized by reference to the remaining portions of the specification and the attached drawings.

DESCRIPTION OF SPECIFIC EMBODIMENTS

Figure 1:
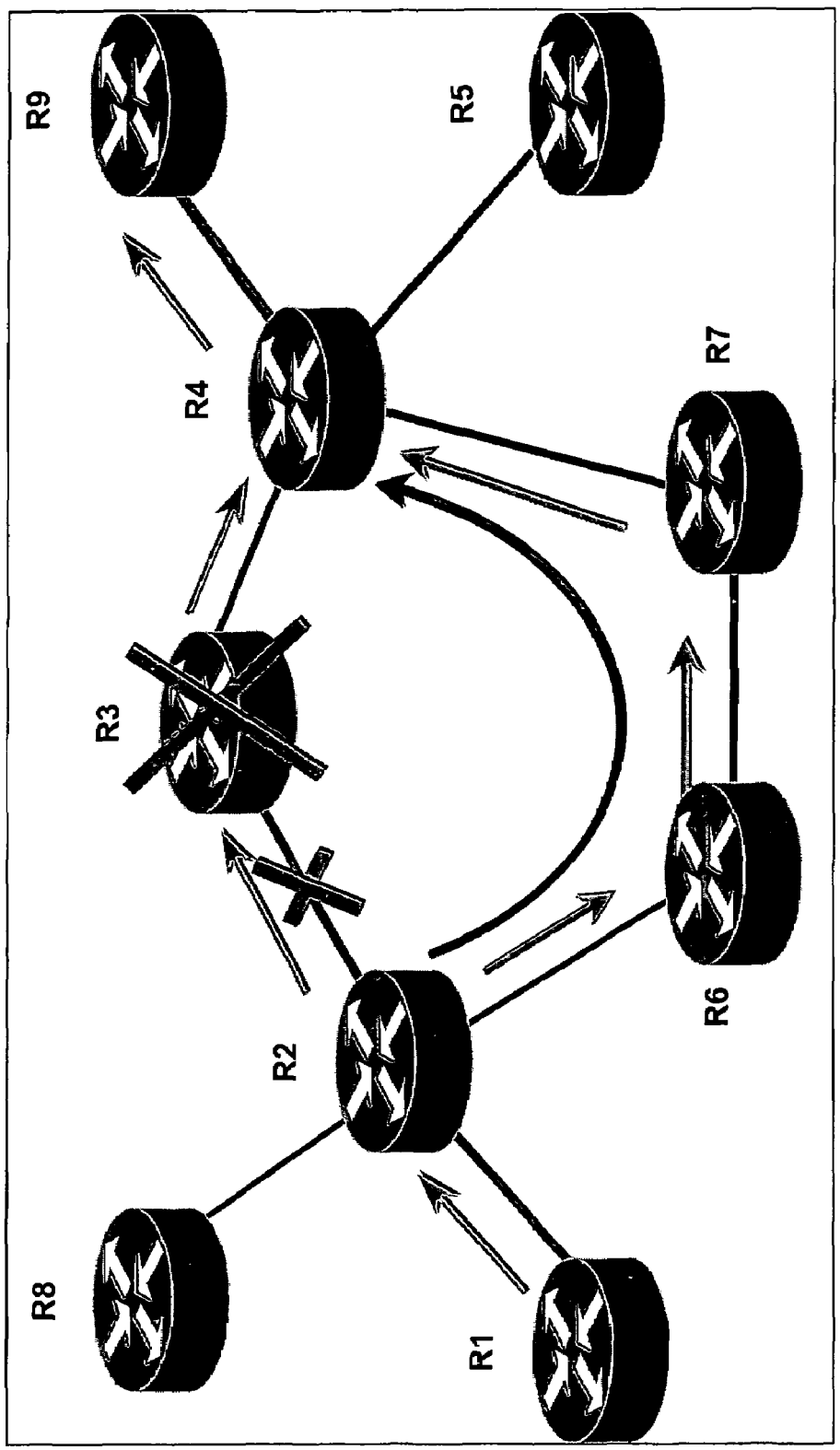
FIG. 1 depicts a network scenario to which embodiments of the present invention may be applied.

The present invention will be described with reference to a representative network environment and applies a certain combination of network protocols to forward data through the network. The links may be implemented using any type of physical medium such as, e.g., an optical medium, wireless medium, twisted pair, etc. Links may also be logical connections to give the connected nodes the property of adjacency in view of the operative networking protocols. In one embodiment, the nodes of such a network interoperate in the manner specified by various protocols including, e.g., TCP/IP and protocols defined by, but not limited to, the following documents:

E. Rosen, et al., "Multiprotocol Label Switching Architecture," RFC 3031, Internet Engineering Task Force, January 2001.

Braden, et al. "Resource ReSerVation Protocol (RSVP)-Version 1 Functional Specification," RFC 2205, Internet Engineering Task Force, September 1997.

Awduche, et al., "Requirements for Traffic Engineering Over MPLS," RFC 2702, Internet Engineering Task Force, September 1999.

Berger, et al., "Generalized MPLS Signaling—RSVP-TE Extensions," RFC 3473, Internet Engineering Task Force, January 2003.

Pan, et al., "Fast Reroute Techniques in RSVP-TE," Internet Draft, Internet Engineering Task Force, November 2004.

Farrel, et al. "Encoding of Attributes for Multiprotocol Label Switching (MPLS) Label Switched Path (LSP) Establishment Using RSVP-TE," IETF Internet Draft, March 2004.

Kompella, et al. "Detecting MPLS Data Plane Failures," IETF Internet Draft, February 2004.

The above documents are incorporated herein by reference in their entirety for all purposes.

In one embodiment, network nodes referenced herein are IP routers that implement multi protocol label switching (MPLS) and operate as label switched routers (LSRs). In one simple MPLS scenario, at the egress of the network, labels are assigned to each incoming packet based on its forwarding equivalence class before forwarding the packet to the next hop node. At each intermediate node, a forwarding selection and a new substitute label are determined by using the label found in the incoming packet as a reference to a label forwarding table. At the network egress (or one hop prior), a forwarding decision is made based on the incoming label but no label is included when the packet is sent on to the next hop.

The paths taken by packets that traverse the network in this manner are pre-configured and referred to as label switched paths (LSPs). Establishment of an LSP requires the control plane to compute a path, signal the path, and modify forwarding tables along the path. The forwarding plane then uses the forwarding tables to forward traffic along the LSP.

Embodiments of the present invention provide improved consistency between the forwarding and control planes for a broad spectrum of uses of MPLS LSPs. These include, but are not limited to, e.g., MPLS Traffic Engineering LSPs and MPLS Traffic Engineering Fast Reroute LSPs. The application of embodiments of the present invention to MPLS Fast Reroute tunnels will now be discussed in detail.

FIG. 1 depicts a representative network scenario to which embodiments of the present invention may be applied. There are nine routers R1 through R9. A Traffic Engineering LSP has been signaled from R1 to R9 through R2, R3, and R4. A Fast Reroute backup tunnel has been pre-configured to protect this Traffic Engineering LSP against the failure of node R3 or the links adjoining it. This backup tunnel extends from R2 to R4 through R6 and R7. R2 is thus the point of local repair (PLR) for this backup tunnel. When a failure of the link between R2 and R3 or a failure of the node R3 is detected by R2, R2 quickly reroutes the Traffic Engineering LSP traffic over the backup tunnel.

The MPLS Traffic Engineering tunnel is signaled using RSVP PATH messages that flow downstream toward the tunnel tail-end and RSVP RESV messages that return upstream toward the tunnel tail-end. The RSVP messages include Record Route Object (RRO) objects. The RSVP RESV messages that contain RRO objects continue to flow upstream during the life of the MPLS Traffic Engineering tunnel to maintain the reservation of resources. An RRO object, as adapted for MPLS Traffic Engineering, includes, within its attributes sub-object, flags that relate to the current protection state of the Traffic Engineering tunnel at each hop. In particular, there is a flag "Local Protection Available" that indicates whether the Traffic Engineering LSP is protected at a particular node. In the prior art, this bit reflects the control plane's understanding of backup tunnel availability irrespective of backup tunnel forwarding plane status. There are also flags which indicate whether the selected backup tunnel is a so-called next hop (NHOP) tunnel that protects a link following a PLR or a so-called next-next-hop (NNHOP) tunnel that protects both a node and a link following a PLR.

Embodiments of the present invention allow a PLR to verify the forwarding plane status of a backup tunnel and communicate status to the Traffic Engineering LSP head-end. For this purpose, a new bit is defined in the LSP-ATTRIBUTES object carried within the RSVP RESV message. This bit is referred to as "Local Protection Status Verified." This new bit indicates whether the forwarding plane of the backup tunnel has in fact been tested. The "Local Protection Available" bit now reflects the results of forwarding plane testing. The "Local Protection Available" bit can be clear either because the control plane does not maintain state for a backup tunnel or because the backup tunnel, although operational in view of the control plane, has been found to be non-operational by a test of the corresponding forwarding plane.

Figure 2:
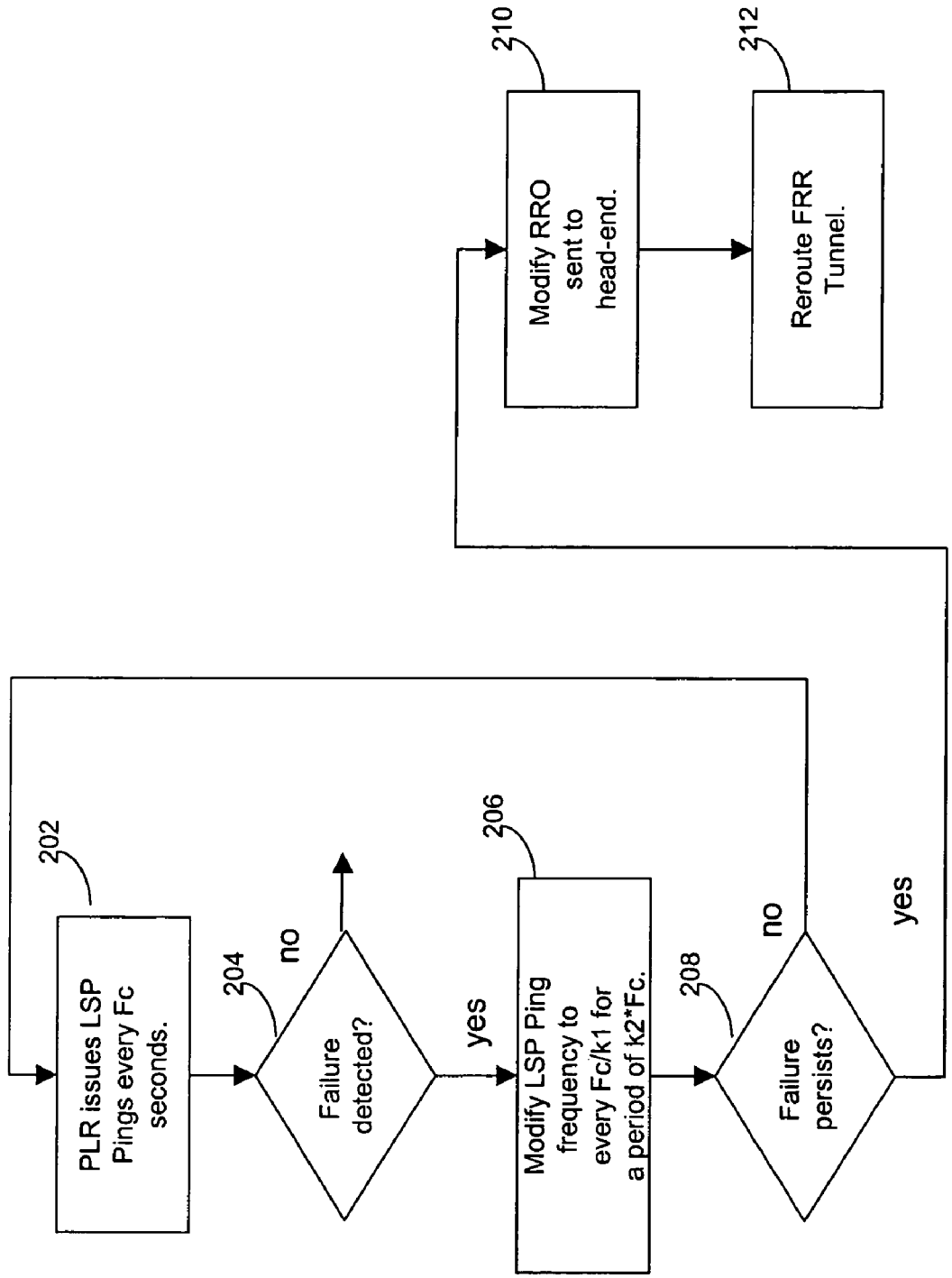
FIG. 2 is a flow chart describing steps of operation of a point of local repair (PLR) according to one embodiment of the present invention.

FIG. 2 is a flow chart describing the steps of operating a PLR according to one embodiment of the present invention. The PLR verifies operation of the forwarding plane and if an inconsistency with the control plane is detected, various steps can be taken.

At step 202, in one particular implementation, the PLR tests the integrity of the backup tunnel forwarding plane every $F_c$ seconds. After the forwarding plane is tested, the "Local Protection Status Verified" bit is set if not set already. In one implementation, the detection mechanism employs LSP Pings as specified by the Internet Draft entitled "Detecting MPLS Data Plane Failures." An LSP Ping is somewhat analogous to an ICMP echo request as known in the art. Also, there is the provision for a "traceroute" facility for LSPs provided by the same Internet Draft.

The LSP Ping is forwarded like any packet would be forwarded over the LSP. The LSP Ping ultimately reaches the end of the LSP. There it is processed by the control plane of the final LSR (the tail-end) which verifies that it is in fact the tail-end for that LSP. This final LSR then responds to the LSR that issued the LSP Ping albeit not via the unidirectional LSP but rather in any other suitable way using IP and/or MPLS. If the LSP Ping is not returned for an LSP that is understood by the control plane to be alive, this indicates a forwarding plane failure such as a corruption of a forwarding table at an LSR somewhere along the LSP.

It may also be useful for the detection mechanism to identify where along the LSP the forwarding plane is broken. An LSP Ping traceroute packet could be sent to the control plane at each LSR along the LSP. These LSRs respond to the traceroute message to verify connectivity until that point in the LSP.

The LSP Ping detection and fault locating mechanisms are, however, merely presented as an example. For example, an autonomous agent such as the Service Assurance Agent provided by Cisco Systems could be used automatically to generate similar messages. The Service Assurance Agent can also measure delay, jitter, and packet loss along an LSP. Also LSP Ping messages may also be generated by way of the automatic techniques disclosed in the Internet Draft entitled "Label Switching Router Self-Test." Network analyzing equipment as known in the art may also be used to probe the integrity of the LSP forwarding plane.

Step 204 tests whether step 202 detects a forwarding plane failure. If no failure is detected the detection mechanism is repeatedly invoked at step 202. If a failure is detected, execution proceeds to step 206. It should be noted that forwarding plane failure is not restricted to a broken connection but also may include anomalies such as excessive delay, excessive jitter, excessive packet loss, etc. All of these can be registered by the use of appropriate detection mechanisms. Step 206 modifies the LSP Ping frequency (or frequency of invocation of the alternate detection mechanism) to $F_c/k_1$ for a period of $k_2*F_c$. The variables $k_1$ and $k_2$ may be freely configurable or hardwired. It may be desirable to reduce the Ping frequency at step 206 to reduce testing overhead but depending on network configuration, it may desirable to increase the Ping frequency instead.

Step 208 tests whether the failure persists at the new probing frequency. If the failure does not persist, then processing returns to step 202. If the failure does persist, a variety of actions can be taken in response at the PLR. One desired action is that, at step 210, the PLR modifies the RRO object it sends to the head-end to clear the "Local Protection Available" bit. The "Local Protection Status Verified" was set previously so the head-end will be aware that there has been a forwarding plane failure at the PLR and will be able to take appropriate action.

Other notifications that may be made by the PLR at this point include use of the system log (syslog), the local command line interface, or local notifications and changes to the SNMP (Simple Network Management Protocol) MIB (Management Information Base). At step 212, the PLR may reroute the FRR tunnel. All or a subset of the links and nodes included in the current backup tunnel may be pruned from network topology used for computation of the alternate backup tunnel. Particular elements to prune may be selected based on results of an LSP Ping traceroute. In this way the forwarding and control planes are brought back into synchronization.

Figure 3:
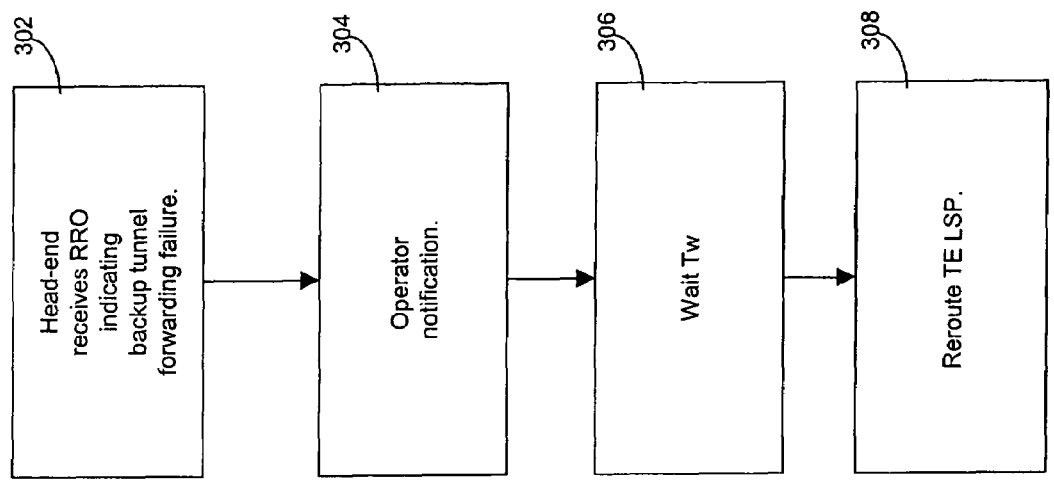
FIG. 3 is a flow chart describing steps of operation of a Traffic Engineering LSP head-end according to one embodiment of the present invention.

FIG. 3 is a flow chart describing steps of operating an MPLS Traffic Engineering LSP head-end according to one embodiment of the present invention. The head-end will interpret the received "Local Protection Available" and "Local Protection Status Verified" bits. If both bits are clear, there is no backup tunnel at the PLR in question. If both bits are set then a backup tunnel is available and its forwarding plane has been checked. If the "Local Protection Available" bit is set and the "Local Protection Status Verified" bit is clear, the backup tunnel is operational from a control plane viewpoint but the forwarding plane has not been tested. If the "Local Protection Available" bit is set and the "Local Protection Status Verified" bit is set, the backup tunnel control plane is up but the forwarding plane has a fault.

At step 302, the head-end receives a RESV message indicating a forwarding plane failure for a backup tunnel. The "Local Protection Available" bit is set while the "Local Protection Status Verified" bit is clear.

The head-end can react in a variety of ways. At step 304, the head-end notifies the operator. Mechanisms for operator notification include the above-mentioned syslog, the command line interface, or SNMP MIB notifications. The operator may then request manual reconfiguration of the backup tunnel at the PLR or may reroute the Traffic Engineering LSP to avoid the PLR that has been affected by the backup tunnel forwarding plane failure.

Alternatively, this type of rerouting can occur automatically. However, a step 306 waits $T_w$ seconds to allow for the possibility that the PLR will itself correct the backup tunnel problem and find a new backup tunnel. Such a waiting period would not be used if the backup tunnel had been torn down by the control plane. If, after the waiting period, received RRO objects continue to indicate a corrupted forwarding plane for the backup tunnel in question, then at step 308 the head-end may reroute the Traffic Engineering LSP to avoid the impacted PLR.

Preferably, the use of backup tunnel forwarding plane testing and synchronization is locally configured at each PLR on a per-interface basis. The values of $F_c$, $k_1$, and $k_2$ may also be configured per-interface. Alternatively, the MPLS Traffic Engineering LSP head-end may request forwarding plane verification of backup tunnels by setting a special bit in the LSP-ATTRIBUTES object carried in the RSVP PATH message.

For MPLS Traffic Engineering LSPs that are not backup tunnels, a somewhat simpler procedure will be followed. The head-end itself will invoke the appropriate detection mechanism. Then when a forwarding plane failure is detected, the head-end will notify the operator and/or also take action to automatically recompute the MPLS Traffic Engineering LSP. In this way the control plane and forwarding plane are brought back into synchronization.

Figure 4:
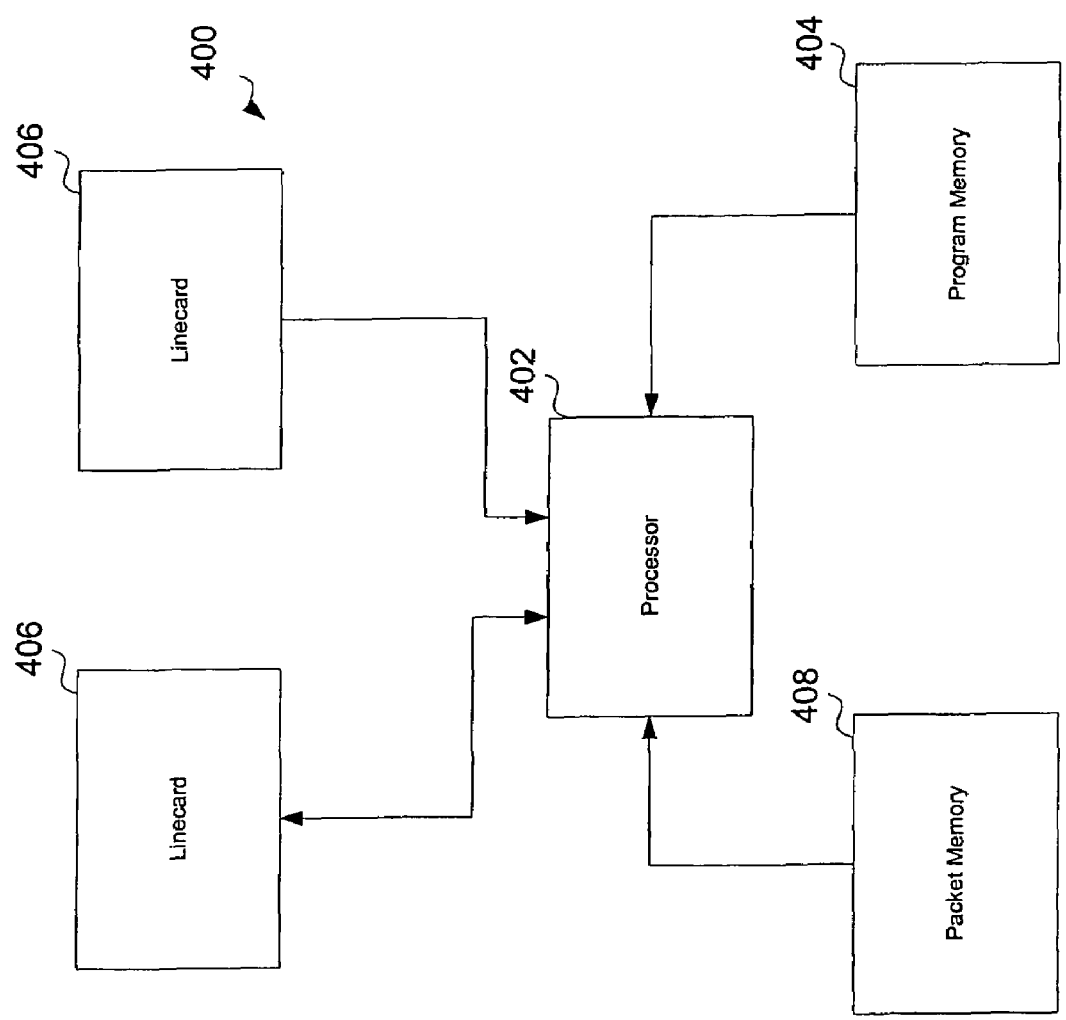
FIG. 4 depicts a network device that can be used to implement embodiments of the present invention.

FIG. 4 depicts a network device 400 that may be used to implement, e.g., any of the routers of FIG. 1 and/or perform any of the steps of FIG. 2 or FIG. 3. In one embodiment, network device 400 is a programmable machine that may be implemented in hardware, software, or any combination thereof. A processor 402 executes codes stored in a program memory 404. Program memory 404 is one example of a computer-readable medium. Program memory 404 can be a volatile memory. Another form of computer-readable medium storing the same codes would be some type of non-volatile storage such as floppy disks, CD-ROMs, DVD-ROMs, hard disks, flash memory, etc.

Network device 400 interfaces with physical media via a plurality of linecards 406. Linecards 406 may incorporate Ethernet interfaces, DSL interfaces, Gigabit Ethernet interfaces, 10-Gigabit Ethernet interfaces, SONET interfaces, etc. As packets are received, processed, and forwarded by network device 400, they may be stored in a packet memory 408. Network device 400 implements all of the network protocols and extensions thereof described above as well as the data networking features provided by the present invention.

In one implementation, control plane operations are controlled and signaled by processor 402 while forwarding tables are maintained on linecards 406. The present invention is, however, not limited to a distributed architecture. To implement functionality according to the present invention, linecards 406 may incorporate processing and memory resources similar to those discussed above in connection with the network device as a whole.

It is understood that the examples and embodiments that are described herein are for illustrative purposes only and that various modifications and changes in light thereof will be suggested to persons skilled in the art and are to be included within the spirit and purview of this application and scope of the appended claims and their full scope of equivalents.

The invention claimed is:

1. A method for assuring availability of Fast Reroute protection for an MPLS Traffic Engineering LSP, said method comprising:
at a selected router along said MPLS traffic engineering LSP, verifying forwarding state of a Fast Reroute tunnel, wherein verifying forwarding state comprises:
forwarding a verification packet over said LSP to the end of the LSP to verify operation of the forwarding plane, wherein forwarding comprises utilizing a forwarding table associated with a forwarding plane and used to forward traffic on said LSP;
if a response to said verification packet is received, setting a protection status verified bit in a control plane message;
if a response to said verification packet is not received, detecting corrupted forwarding state along said LSP; and
if said verifying detects corrupted forwarding state along said Fast Reroute tunnel, rerouting said Fast Reroute tunnel and notifying a head-end router of said MPLS Traffic Engineering LSP corrupted forwarding state.

2. The method of claim 1 further comprising:
after said notifying, using said head-end router to reroute said MPLS Traffic Engineering LSP.

3. The method of claim 1 wherein verifying comprises:
employing LSP Ping.

4. A method for assuring availability of Fast Reroute protection for an MPLS Traffic Engineering LSP, said method comprising:
at a selected router along said MPLS Traffic Engineering LSP, verifying forwarding state of a Fast Reroute tunnel, wherein verifying comprises:
forwarding a verification packet over said LSP to the end of the LSP to verify operation of the forwarding plane, wherein forwarding comprises utilizing a forwarding table associated with a forwarding plane and used to forward traffic on said LSP; and
if a response to said verification packet is received, verifying local protection status in a control plane message transmitted to a head-end node;
if a response to said verification packet is not received, detecting corrupted forwarding state along said LSP; and
if said verifying detects corrupted forwarding state along said Fast Reroute tunnel, notifying a head-end router of said MPLS Traffic Engineering LSP corrupted forwarding state and rerouting said Fast Reroute tunnel.

5. The method of claim 4 wherein verifying comprises:
employing LSP Ping.

6. The method of claim 4 further comprising:
after said notifying, using said head-end router to reroute said MPLS Traffic Engineering LSP.

7. A computer-readable storage medium encoded with a computer program for assuring availability of Fast Reroute protection for an MPLS Traffic Engineering LSP, said computer program comprising:
code that, at a selected router along said MPLS traffic engineering LSP, causes verification of forwarding state of a Fast Reroute tunnel, wherein code that verifies forwarding state comprises:
code that forwards a verification packet over said LSP to the end of the LSP to verify operation of the forwarding plane, wherein code that forwards comprises code that utilizes a forwarding table associated with a forwarding plane and used to forward traffic on said LSP;
code that sets a protection status verified bit in a control plane message, if a response to said verification packet is received;
code that detects corrupted forwarding state along said LSP, if a response to said verification packet is not received; and
code that, if said code that causes verification detects corrupted forwarding state along said Fast Reroute tunnel, causes rerouting of said Fast Reroute tunnel and notification of a head-end router of said MPLS Traffic Engineering LSP corrupted forwarding state.

8. The computer-readable storage medium of claim 7 further comprising:
code that, after said notification, causes use of said head-end router to reroute said MPLS Traffic Engineering LSP.

9. The computer-readable storage medium of claim 7 wherein said code that causes verification comprises:
code that causes employment of LSP Ping.

10. A computer-readable storage medium encoded with a computer program for assuring availability of Fast Reroute protection for an MPLS Traffic Engineering LSP, said computer program comprising:
code that, at a selected router along said MPLS Traffic Engineering LSP, causes verification of forwarding state of a Fast Reroute tunnel, wherein code that verifies comprises:
code that forwards a verification packet over said LSP to the end of the LSP to verify operation of the forwarding plane, wherein code that forwards comprises code that utilizes a forwarding table associated with a forwarding plane and used to forward traffic on said LSP; and
code that verifies local protection status in a control plane message transmitted to a head-end node, if a response to said verification packet is received;
code that detects corrupted forwarding state along said LSP, if a response to said verification packet is not received; and
code that, if said verification detects corrupted forwarding state along said Fast Reroute tunnel, causes notification of a head-end router of said MPLS Traffic Engineering LSP corrupted forwarding state and rerouting of said Fast Reroute tunnel.

11. The computer-readable storage medium of claim 10 wherein said code that causes verification comprises:
code that employment of LSP Ping.

12. The computer-readable storage medium of claim 10 further comprising:
code that, after said notification, causes use of said head-end router to reroute said MPLS Traffic Engineering LSP.

13. Apparatus for assuring availability of Fast Reroute protection for an MPLS Traffic Engineering LSP, said apparatus comprising:
a processor; and
a memory that stores software for execution by said processor, said software comprising:
code that, at a selected router along said MPLS traffic engineering LSP, causes verification of forwarding state of a Fast Reroute tunnel, wherein code that verifies forwarding state comprises:
code that forwards a verification packet over said LSP to the end of the LSP to verify operation of the forwarding plane, wherein code that forwards comprises code that utilizes a forwarding table associated with a forwarding plane and used to forward traffic on said LSP;

code that sets a protection status verified bit in a control plane message, if a response to said verification packet is received;

code that detects corrupted forwarding state along said LSP, if a response to said verification packet is not received; and code that, if said code that causes verification detects corrupted forwarding state along said Fast Reroute tunnel, causes rerouting of said Fast Reroute tunnel and notification of a head-end router of said MPLS Traffic Engineering LSP corrupted forwarding state.

14. Apparatus for assuring availability of Fast Reroute protection for an MPLS Traffic Engineering LSP, said apparatus comprising:

a processor; and a memory that stores software for execution by said processor, said software comprising:

code that, at a selected router along said MPLS Traffic Engineering LSP, causes verification of forwarding state of a Fast Reroute tunnel, wherein code that verifies comprises:

code that forwards a verification packet over said LSP to the end of the LSP to verify operation of the forwarding plane, wherein code that forwards comprises code that utilizes a forwarding table associated with a forwarding plane and used to forward traffic on said LSP; and code that verifies local protection status in a control plane message transmitted to a head-end node, if a response to said verification packet is received;

code that detects corrupted forwarding state along said LSP, if a response to said verification packet is not received; and code that, if said verification detects corrupted forwarding state along said Fast Reroute tunnel, causes notification of a head-end router of said MPLS Traffic Engineering LSP corrupted forwarding state and rerouting of said Fast Reroute tunnel.

15. Apparatus for assuring availability of Fast Reroute protection for an MPLS Traffic Engineering label switched path (LSP), said apparatus comprising:

means for verifying forwarding state of a Fast Reroute tunnel, wherein verifying comprises:

means for forwarding a verification packet over said LSP to the end of the LSP to verify operation of the forwarding plane, wherein means for forwarding comprises means for utilizing a forwarding table associated with a forwarding plane and used to forward traffic on said LSP; and means for setting a protection status verified bit in a control plane message, if a response to said verification packet is received;

means for, if said verifying means detects corrupted forwarding state along said Fast Reroute tunnel, rerouting said Fast Reroute tunnel and notifying a head-end router of said MPLS Traffic Engineering LSP corrupted forwarding state.

16. The apparatus of claim 13 wherein said code that causes verification comprises code that causes employment of LSP Ping.

17. The apparatus of claim 14 further comprising code that, after said notification, causes use of said head-end router to reroute said MPLS Traffic Engineering LSP.

18. The apparatus of claim 15 further comprising means for using said head-end router to reroute said MPLS Traffic Engineering LSP.

* * * * *